(12) United States Patent
Tamamoto

(10) Patent No.: US 7,757,661 B2
(45) Date of Patent: Jul. 20, 2010

(54) ENGINE ROTATION SPEED CONTROLLER FOR WORKING MACHINE

(75) Inventor: Ryuhei Tamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 395 days.

(21) Appl. No.: 12/063,096

(22) PCT Filed: Jul. 20, 2006

(86) PCT No.: PCT/JP2006/314370

§ 371 (c)(1),
(2), (4) Date: Feb. 6, 2008

(87) PCT Pub. No.: WO2007/018022

PCT Pub. Date: Feb. 15, 2007

(65) Prior Publication Data

US 2009/0101105 A1    Apr. 23, 2009

(30) Foreign Application Priority Data

Aug. 8, 2005    (JP)    ............... 2005-229397

(51) Int. Cl.
*F02P 5/15*    (2006.01)
*F02D 9/02*    (2006.01)
(52) U.S. Cl. .............. 123/339.11; 123/350; 123/406.54
(58) Field of Classification Search ........... 123/399.11, 123/335, 350, 406.23, 406.54, 406.5
See application file for complete search history.

(56) References Cited

U.S. PATENT DOCUMENTS 5,775,297 A    7/1998    Koike et al.

(Continued)

FOREIGN PATENT DOCUMENTS

JP    3-229943 A    10/1991

(Continued)

OTHER PUBLICATIONS

International Search Report of PCT/JP2006/314370, date of mailing Aug. 22, 2006.

(Continued)

*Primary Examiner*—Hieu T Vo
(74) *Attorney, Agent, or Firm*—Westerman, Hattori, Daniels & Adrian, LLP

(57) ABSTRACT

When an engine rotation speed in an engine for working machine without a governor mechanism is increase-and-decrease-controlled by switching ignition timings at a predetermined rotation speed, the response delay of the engine rotation speed with respect to the throttle opening operation is suppressed. The engine rotation speeds for switching the ignition timings are set to 4000 rpm and 5000 rpm. When the throttle opening is increased, a first ignition timing is advanced stepwise to a second ignition timing at the engine rotation speed of 4000 rpm so as to be switched to a rotation control characteristic C30 for high speed rotation. When the throttle opening is decreased, the second ignition timing is retarded stepwise to the first ignition timing at the engine rotation speed of 5000 rpm so as to be switched to a rotation control characteristic C05 for low speed rotation. The switching timing of the rotation control characteristic is different between at increase and decrease of the throttle opening. The difference can be reduced to a small amount ΔTH.

4 Claims, 5 Drawing Sheets

U.S. PATENT DOCUMENTS 6,467,456 B2 * 10/2002 Shidara et al. ......... 123/406.54
7,320,306 B2 * 1/2008 Tamamoto et al. .......... 123/350

FOREIGN PATENT DOCUMENTS

| JP | 7-317577 A | 12/1995 |
| JP | 9-126105 A | 5/1997 |
| JP | 9-236071 A | 9/1997 |
| JP | 2005-163616 A | 6/2005 |

OTHER PUBLICATIONS

International Preliminary Report dated Feb. 12, 2008 issued in corresponding International Application No. PCT/JP2006/314370.

* cited by examiner

PRIOR ART

ENGINE ROTATION SPEED CONTROLLER FOR WORKING MACHINE

TECHNICAL FIELD

The present invention relates to a rotation speed controller of an internal combustion engine for working machine. More specifically, the present invention relates to an engine rotation speed controller which can control an engine rotation speed without having a governor mechanism, that is, mechanical speed control means.

BACKGROUND ART

In general, rotation speed of an engine for driving a working machine, such as a small-size versatile engine, is controlled to a rotation speed suitable for a load by opening control of a carburetor by a governor mechanism. There has been known the governor mechanism which moves a link mechanism by a centrifugal force corresponding to an engine rotation speed and transmits movement of the link mechanism to a throttle valve to perform throttle opening control. An engine used as the power source of a handheld mowing machine or blower is used at a relatively high rotation speed. Therefore, the conventional governor mechanism is hard to obtain a stable controlled effect and a working machine is required to be made smaller and more lightweight. Because of such situations, the engine is not provided with the governor mechanism in many cases.

In the engine which does not have the governor mechanism, the ignition timing of an ignition device is almost constant regardless of the change in the engine rotation speed and the engine rotation speed is the function of the throttle opening of the carburetor. The operator can perform variable control by the throttle opening adjustment operation. The throttle opening is maintained at a predetermined value, thereby maintaining the engine rotation speed at an almost constant value.

On the other hand, like a digital CDI, the ignition device of the engine is microcomputer-controlled so that the relation between the engine rotation speed and the ignition timing can be arbitrarily set. Using this, the ignition device has recently had appropriate ignition advance characteristics (as an example, see Japanese Patent Application Laid-Open No. 2005-163616).

[Patent Document 1] Japanese Patent Application Laid-Open No. 2005-163616

DISCLOSURE OF THE INVENTION

Problems to be Solved by the Invention

In the digital CDI which can be used by switching the ignition timings according to the engine rotation speed, unless selection of the ignition timing with respect to the set rotation speed is appropriate, the engine rotation speed cannot follow the throttle opening changed. This will be described with reference to the drawing.

FIG. 8 is an engine characteristic diagram showing correspondence between the throttle opening and the engine rotation speed in case of two ignition timings are applied. The two characteristics are an ignition timing characteristic at an advance angle of 30° (called a "characteristic C30") and an ignition timing characteristic at an advance angle of 5° (called a "characteristic C05").

When the engine is started to gradually increase the throttle opening, the engine rotation speed starts to be increased from an idle rotation speed Neidl according to the characteristic C05. When the throttle opening exceeds Xdeg, the engine rotation speed is switched to the characteristic C30 of the ignition time at an advance angle of 30°. The engine rotation speed is increased to Ne1 all at one. The throttle opening is increased according to the characteristic C30 up to a desired rotation speed so that the engine is brought into the normal loaded operation.

In the normal loaded operation, when the engine rotation speed is decreased or the throttle opening is gradually decreased for returning the engine to the idle operation, the engine rotation speed does not return to Ne1 even if the throttle valve is throttled to the opening Xdeg switched to the characteristic C30 at increase of the rotation speed. When the throttle valve is throttled to an opening Ydeg, the engine rotation speed is switched to the characteristic C05 and is drastically decreased to near the idle rotation speed Neidl.

When the throttle opening is decreased, response delay of the engine rotation speed (for a throttle opening difference, ΔTH) occurs. Therefore, the operation of the working machine is different between at increase and decrease of the engine rotation speed, which makes operator have a sense of incongruity.

An object of the present invention is to provide a rotation speed controller of an engine for working machine which can address the above problem and can perform engine rotation speed control in response to the throttle operation while the operator hardly feel response delay.

Means for Solving the Problems

In order to achieve the above object, the present invention has a first feature in that a rotation speed controller of an engine for working machine which does not have mechanical speed control means and adjusts an engine rotation speed according to a load by the throttle opening operation of the engine using manual operation means, includes: a first rotation control characteristic in which an ignition device of the engine is operated in a region in which the throttle opening is small at a first ignition timing so as to increase the engine rotation speed from an idle rotation speed with increase of the throttle opening; a second rotation control characteristic in which the ignition device is operated in a region in which the throttle opening is large at a second ignition timing on the advance side than the first ignition timing so as to increase the engine rotation speed steeper than the first rotation control characteristic with increase of the throttle opening; and switching means for determining switching timing between the first ignition timing and the second ignition timing based on the engine rotation speed, wherein in the decrease process of the engine rotation speed, the switching means switches the second ignition timing to the first ignition timing at an engine rotation speed higher than that switched to the second ignition timing in the increase process.

The present invention has a second feature in that the advance from the first ignition timing to the second ignition timing is performed stepwise.

The present invention has a third feature in that the rotation speed controller includes a digital control type ignition device which makes the engine rotation speed and the ignition timing correspond with each other for management.

The present invention has a fourth feature in that the rotation speed controller includes an opening fixing function which fixes the throttle opening.

EFFECT OF THE INVENTION

According to the first feature, in the increase process of the engine rotation speed, the engine rotation speed can be switched to the engine rotation control characteristic in which the ignition device is operated at the second ignition timing in which the amount of the advance angle is large upon reaching the region in which the throttle opening is large, and immediately increased. In the decrease process of the engine rotation speed by returning the throttle opening to the close side, the engine rotation speed is regarded to as reaching the region in which the throttle opening is small when engine rotation speed is higher than that switched to the second ignition timing in the increase process of the engine rotation speed. Then the engine rotation speed is returned to the first ignition timing in which the amount of the advance angle is small when the engine rotation speed is higher than that advanced to the second ignition timing in the increase process of the engine rotation speed. In this operation, in the decrease process of the engine rotation speed, the engine rotation speed can be decreased at the same throttle opening as that in the increase process of the engine rotation speed. The rotation speed returning operation to near idle can be performed while the operator hardly feel response delay due to decrease of the engine rotation speed according to the reduced amount of the throttle opening.

According to the second feature, the significant change of the engine rotation speed by mutual switching between the first ignition timing and the second ignition timing can be performed stepwise. The engine rotation speed at the time of changing the throttle opening can be smoothly changed.

According to the third feature, the engine rotation speed and the ignition timing are mapped so that control data can be easily created. The first rotation control characteristic at the first ignition timing and the characteristic performing advance or retardation stepwise between both may be mapped. Therefore the map can be easily created. When the number of rotation control characteristics is increased, the map can also be easily created.

According to the fourth feature, the function of fixing the throttle opening is provided. The function of substantially uniquely determining the engine rotation speed according to the throttle opening can be sufficiently exploited to maintain operation at a stable rotation speed with respect to load fluctuation.

DESCRIPTION OF THE REFERENCE NUMERALS

1 . . . engine, 2 . . . transmission shaft, 3 . . . centrifugal clutch, 8 . . . carburetor, 9 . . . throttle cable, 9c . . . inner wire, 12 . . . throttle shaft, 15 . . . stopper (opening regulating member), 18 . . . throttle lever, 29 . . . rotation speed sensor, 30 . . . ignition timing map

BEST MODE FOR CARRYING OUT THE INVENTION

Figure 3:
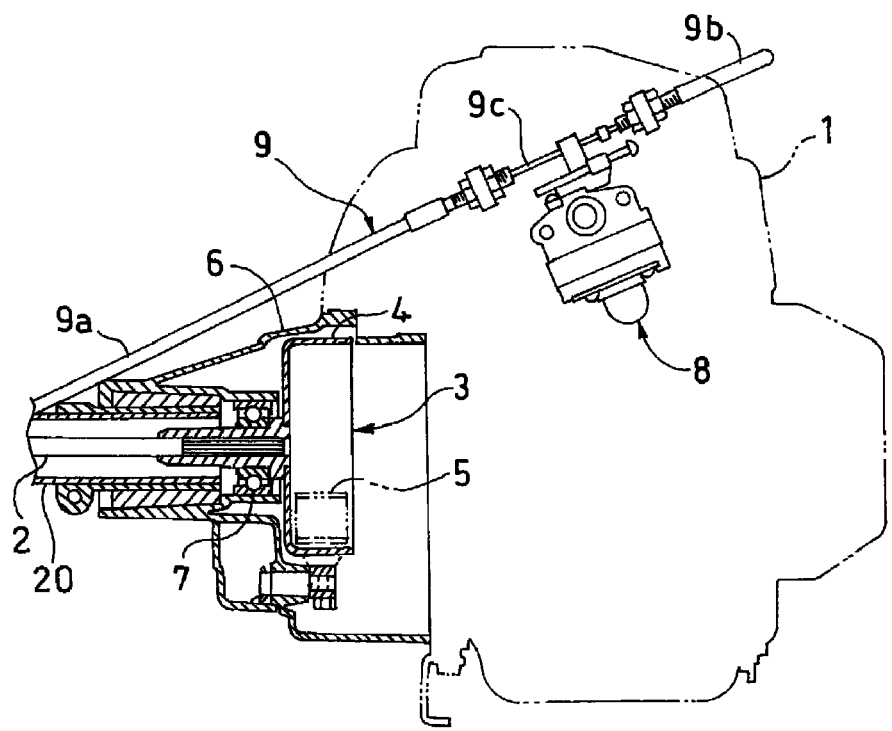
FIG. 3 is a cross-sectional view of an essential part of the mowing machine suitable for application of the rotation speed controller of an engine for working machine according to an embodiment of the present invention.
Figure 2:
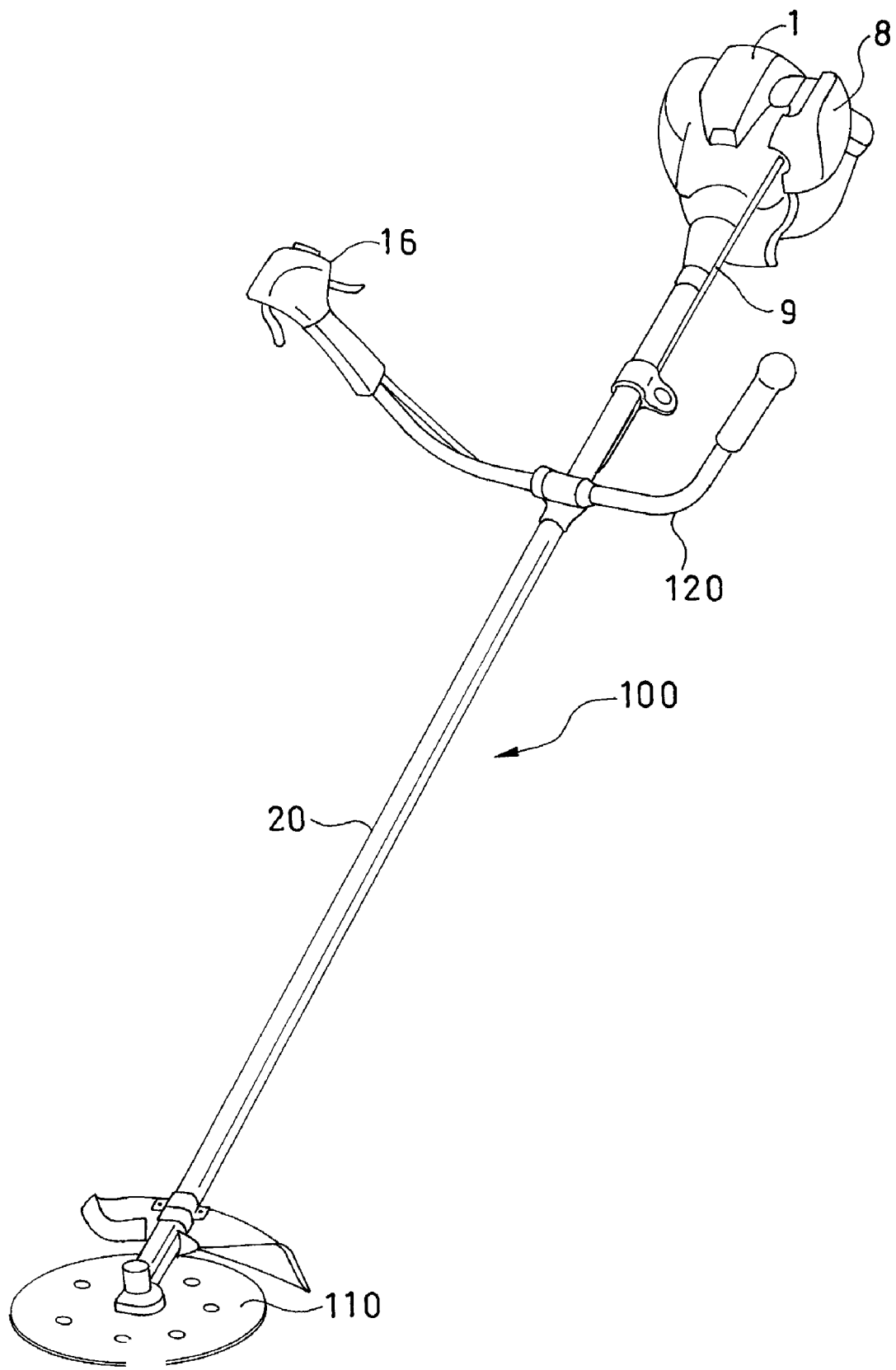
FIG. 2 is a perspective view of a mowing machine to which the controller of the present invention is applied.
Figure 4:
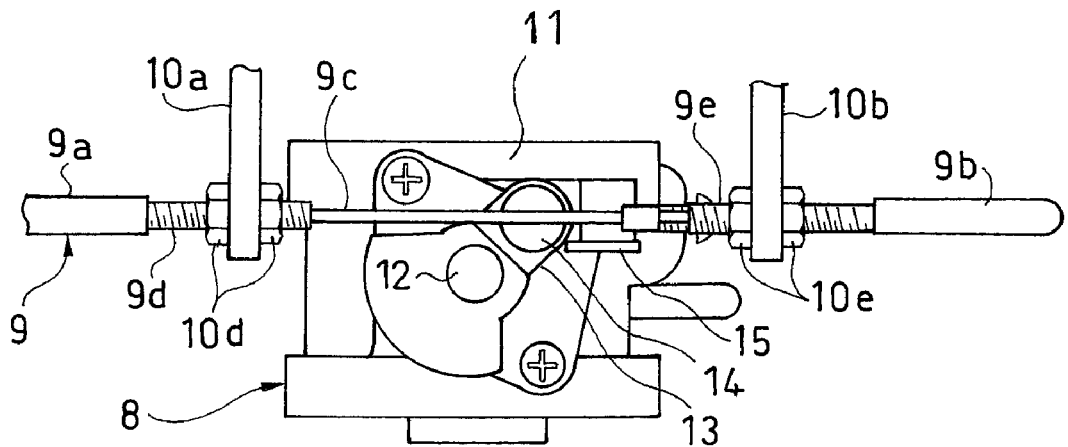
FIG. 4 is a plan view of an essential part of a carburetor provided in the mowing machine.

An embodiment of the present invention will be described below in detail with reference to the drawings. FIG. 2 is a perspective view of a mowing machine equipped with an engine including a rotation speed controller according to an embodiment of the present invention. FIG. 3 is a cross-sectional view of the front portion of the engine. FIG. 4 is a plan view of a carburetor. In FIG. 2, a mowing machine 100 has an engine 1, an operating sleeve 20 extended from the engine 1 and having at its edge a cutting blade 110, a handle 120 provided midway in the operating sleeve 20, and an operating device 16 serving also as a grip and provided at the right end of the handle 120. The mowing machine 100 also has a throttle cable 9 extended from the operating device 16 to a carburetor 8 of the engine. The engine 1 is an air-cooled four-stroke single-cylinder engine of a small type (e.g., the displacement is 25 cm$^3$) preferable for the mowing machine 100.

In FIGS. 3 and 4, a transmission shaft 2 extended from the engine 1 through the operating sleeve 20 to the cutting blade 110 is provided. The transmission shaft 2 is coupled to the crankshaft of the engine 1 via a centrifugal clutch 3. The centrifugal clutch 3 has a bottomed drum 4 having an inner surface contacted when a weight (not shown) attached to the crankshaft is displaced outward by a centrifugal force. The transmission shaft 2 is fixed to the bottom of the drum 4. The drum 4 is held by a clutch case 6 via a bearing 7. A brake shoe 5 pressed onto the outer circumference of the drum 4 and braking the drum 4 is axially supported by the clutch case 6. The transmission shaft 2 is fitted in the clutch case 6 and is extended through the operating sleeve 20 to the cutting blade 100.

The carburetor 8 is attached to the side portion of the engine 1 and is engaged with the throttle cable 9. The cable 9 has a first outer tube 9a extended along the operating sleeve 20 to a throttle lever (described later), a second outer tube 9b extended from the carburetor 8 to the opposite side of the throttle lever, and an inner wire 9c. The first and second tubes 9a and 9b are fixed to brackets 10a and 10b, respectively. Screws 9d and 9e are formed at ends of the first outer tube 9a and the second outer tube 9b, respectively. The brackets 10a and 10b are fastened and fixed by double nuts 10d and 10e. The inner wire 9c has one end fixed to the throttle lever and the other end coupled to the brake shoe 5 via a link mechanism.

The carburetor 8 has a case 11, a throttle shaft 12 attached to a throttle valve, not shown, a throttle arm 13 attached to the throttle shaft 12, and a wire coupling portion 14 rotatably attached to the end of the arm 13. A stopper 15 is provided in such a manner that when the throttle arm 13 is rotated about the throttle shaft 12 counterclockwise, the end face of the throttle arm 13 is brought into contact with the stopper to regulate the open position of the throttle valve. The inner wire 9c is fixed to the coupling portion 14. When the inner wire 9c is pulled by the throttle lever, the throttle arm 13 is swung to rotate the throttle shaft 12. With rotation of the throttle shaft 12, the end of the inner wire 9c operates the brake shoe 5 so as to be separated from the drum 4 via the link mechanism. With the open operation of the throttle valve, the braking of the drum 4, that is, the transmission shaft 2 fixed to the drum, is released.

Figure 5:
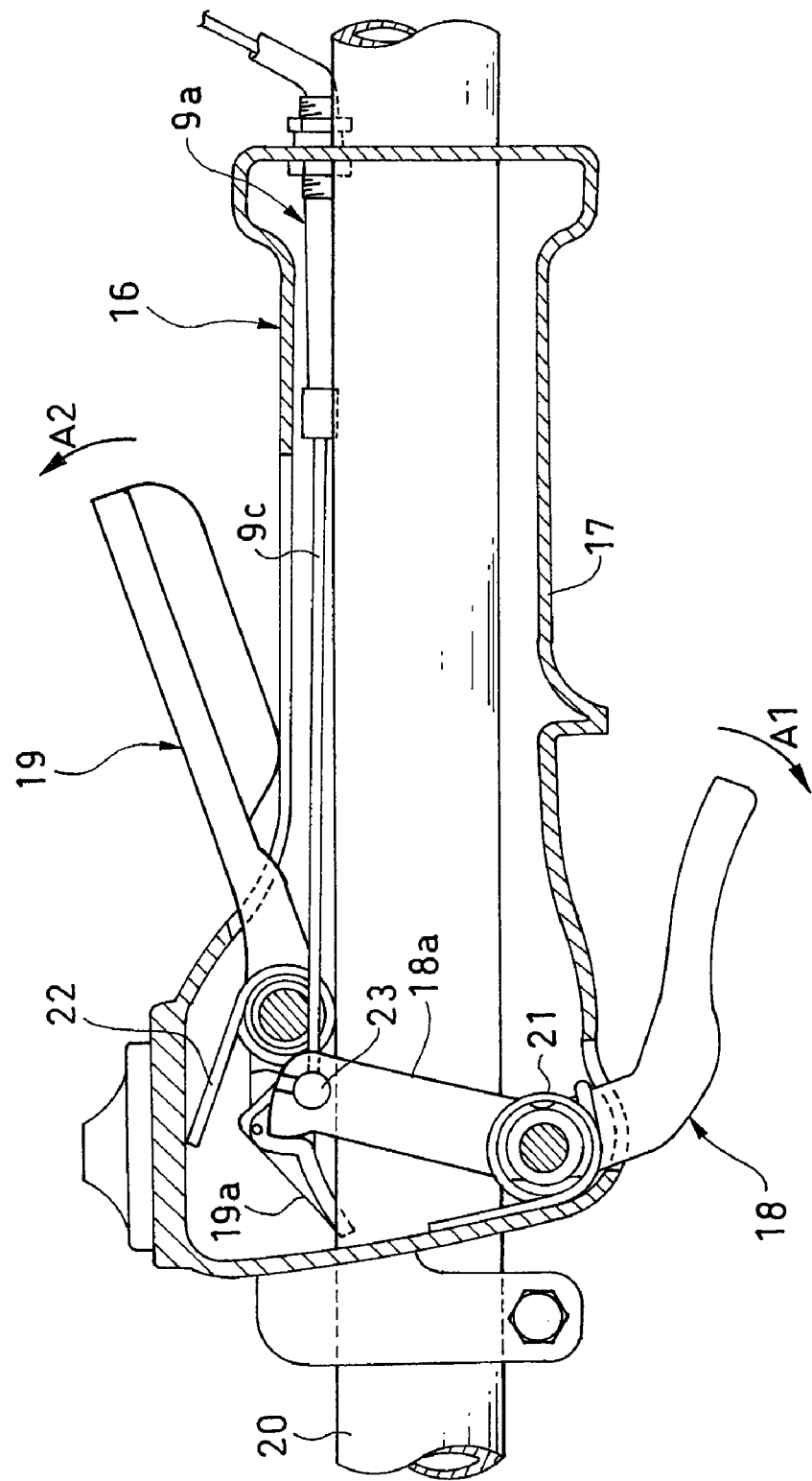
FIG. 5 is a cross-sectional view of a throttle opening operating device.

FIG. 5 is a cross-sectional view of the operating device including the throttle lever. The operating device 16 has a handle case 17, a throttle lever 18 swingably and axially supported by the handle case 17, and a lock lever 19 axially supported by the handle case 17 for locking the throttle lever 18. The throttle lever 18 and the lock lever 19 are biased by springs 21 and 22 in the directions of arrows A1 and A2, respectively. The throttle lever 18 has an arm 18a extended for wire coupling. One end of the inner wire 9c is fixed to the arm 18a by a mounting member 23. In operation, the lock lever 19 is gripped together with the handle case 17 by hand to release the engagement of the edge of the arm 18a with an edge 19a of the lock lever 19. When the throttle lever 18 is gripped together with the handle case 17, the inner wire 9c is pulled to rotate the throttle shaft 12 for opening the throttle valve. When the hand loosens the grip of the throttle lever 18, the throttle lever 18 is rotated and returned by the spring 21 in the direction of the arrow A1. The inner wire 9c is moved in the direction closing the throttle valve.

Figure 1:
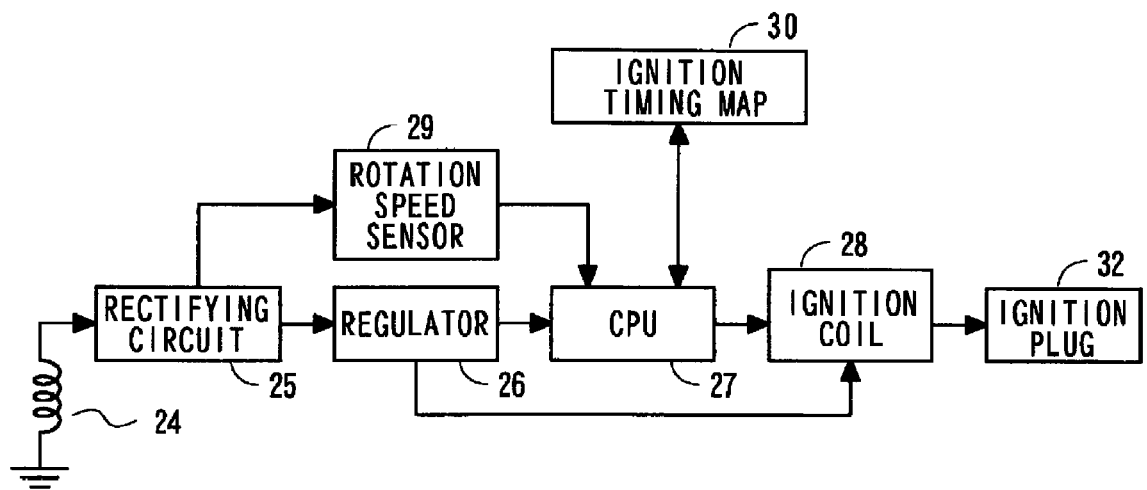
FIG. 1 is a block diagram showing the configuration of a rotation speed controller of an engine for working machine according to an embodiment of the present invention.

FIG. 1 is a diagram showing the configuration of the engine rotation speed controller. The engine 1 (see FIGS. 2 and 3) has a flywheel generator directly coupled to the engine 1. An electric current outputted from a coil 24 of the flywheel generator is rectified by a rectifying circuit 25. The rectified electric current is input to a regulator 26 and is then adjusted to a predetermined voltage. The regulator 26 adjusts the input voltage so as to be suitable as an operating voltage of a CPU 27 and a primary voltage of an ignition coil 28.

A rotation speed sensor 29 outputs a pulse signal for each rotation of the generator based on the rectification waveform provided by the rectifying circuit 25. The CPU 27 computes the frequency of the generator based on the period of the pulse signal, that is, a value representing the rotation speed of the engine 1. There is provided an ignition timing map 30 to which the ignition timing (crank angle) with respect to the engine rotation speed computed by the CPU 27 based on the output pulse of the rotation speed sensor 29 is set. The CPU 27 searches for and reads the ignition timing corresponding to the engine rotation speed input from the ignition timing map 30. Instead of searching for the ignition timing from the map, the CPU 27 may compute the ignition timing using the functional equation of the preset engine rotation speed. In either case, the relation between the engine rotation speed and the ignition timing is provided by the digital computation process using digital data.

The crank angle of the engine 1 can be detected by adding the constant for the relative position of the crank angle to the output pulse timing of the rotation speed sensor 29. The CPU 27 outputs an ignition instruction to the ignition coil 28 when the crank angle read from the ignition timing map 30 is matched with the current crank angle computed based on the output of the rotation speed sensor 29. In response to the ignition instruction, the ignition coil 28 allows a secondary coil connected to an ignition plug 32 to generate a high voltage to ignite the ignition plug 32.

Figure 6:
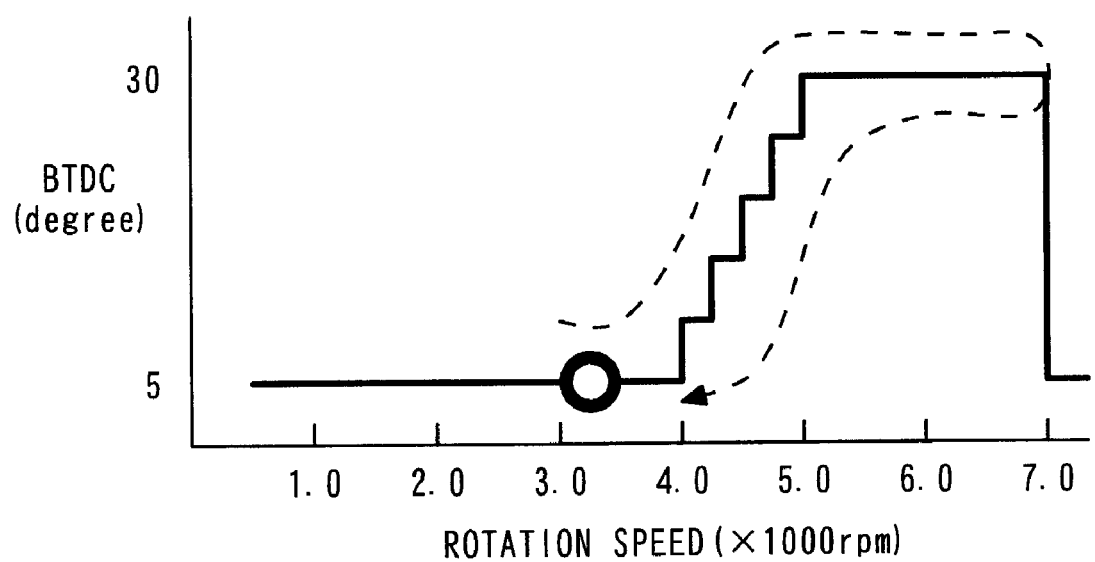
FIG. 6 is a diagram showing an example of an ignition timing map.

FIG. 6 is a diagram showing an example of the engine rotation speed and the ignition timing map. As shown in the drawing, the ignition timing is advanced stepwise from the point at which the engine rotation speed reaches a predetermined rotation speed (e.g., 4000 rpm). In this example, while the engine rotation speed is changed from 4000 rpm to 5000 rpm, the amount of the advance angle of the ignition timing is changed in five steps from 5° to 30°. The amount of change of the advance angle in one step is 5°. According to the map, the ignition timing is switched stepwise to the retardation side at decrease of the engine rotation speed.

Figure 7:
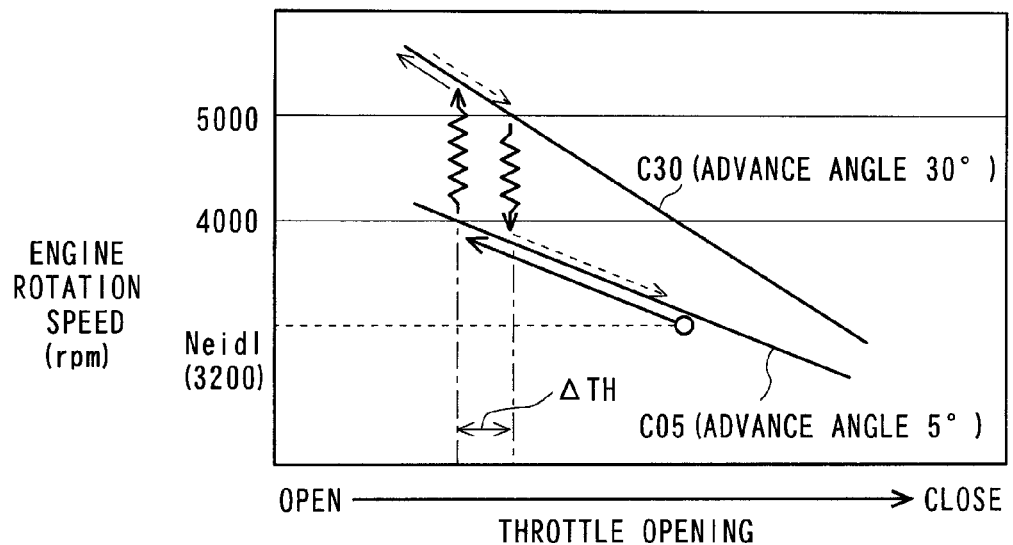
FIG. 7 is a characteristic diagram showing the relation between the engine rotation speed and the throttle opening at each ignition timing according to an embodiment of the present invention.

The change of the engine rotation speed and the throttle opening at switching of the ignition timing according to the map will be described with reference to FIG. 7. In FIG. 7, the engine rotation speed and the throttle opening correspond with two ignition timings. In FIG. 7, when the engine is started and operated at the idle rotation speed Neidl by the characteristic of the ignition timing at an advance angle of 5° ("characteristic C05"), the throttle opening is increased. When the engine rotation speed is increased to 4000 rpm (a predetermined lower rotation speed), the ignition timing is changed 5° to the advance side according to the map of FIG. 6. Thereafter, the ignition timing is advanced 5° stepwise. When exceeding 5000 rpm (a predetermined upper rotation speed), the engine rotation speed is switched to the characteristic of the ignition timing at an advance angle of 3° ("characteristic C30"). The engine rotation speed is then increased according to the characteristic C30 as the throttle opening is increased so that the engine 1 is brought into the normal loaded operation. When the engine rotation speed reaches a predetermined switching rotation speed (in this example, 7000 rpm), the amount of the advance angle is decreased to 5°, as shown in FIG. 6. The engine rotation speed is thus prevented from being increased.

When the throttle opening is decreased in the normal load operation to decrease the engine rotation speed, as indicated by the dotted arrows, the engine rotation speed is decreased to the predetermined upper rotation speed, that is, 5000 rpm, so that the ignition timing is retarded stepwise according to the map of FIG. 6 and the engine rotation speed is decreased stepwise to the predetermined lower rotation speed, that is, 4000 rpm.

Figure 8:
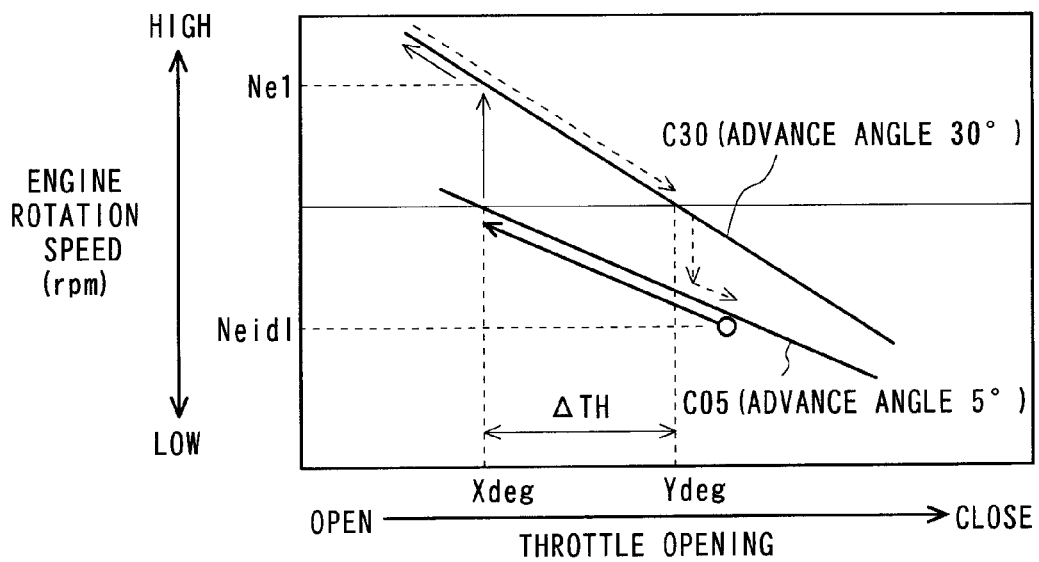
FIG. 8 is a characteristic diagram showing the relation between the engine rotation speed and the throttle opening at each ignition timing according to a conventional art.

The characteristic diagram of the engine rotation speed and the throttle opening of FIG. 7 is compared with that of FIG. 8. In FIG. 7 of this embodiment, it is found that the throttle opening difference ΔTH at switching of the ignition timings between at increase and decrease of the engine rotation speed is smaller than that of FIG. 8. The engine rotation speed is greatly changed (from 4000 rpm to 5000 rpm) at the substantially same throttle opening at increase and decrease of the engine rotation speed. The operator cannot have a sense of incongruity.

The engine for working machine including the rotation speed controller is not limited to the mowing machine and is applicable to a managing machine.

The present invention is not limited to the engine for the mowing machine or the managing machine and is widely applicable to the engine for driving a working machine of the type adjusting the rotation speed by the operation of the throttle opening operating device without being equipped with the governor mechanism.

The invention claimed is:

1. A rotation speed controller of an engine for working machine which has manual operation means of a throttle opening of the engine and adjusts an engine rotation speed according to a load by the manual operation means, comprising:

a first rotation control characteristic in which an ignition device of the engine is operated in a region in which the throttle opening is small at a first ignition timing so as to increase the engine rotation speed from an idle rotation speed with increase of the throttle opening;

a second rotation control characteristic in which the ignition device is operated in a region in which the throttle opening is large at a second ignition timing on the advance side than the first ignition timing so as to increase the engine rotation speed steeper than that of the first rotation control characteristic with increase of the throttle opening; and switching means for determining the first ignition timing or the second ignition timing switched to each other based on the engine rotation speed, wherein in the decrease process of the engine rotation speed, the switching means switches the second ignition timing to the first ignition timing at an engine rotation speed higher than that switched to the second ignition timing in the increase process.

2. The rotation speed controller of an engine for working machine according to claim 1, characterized in that the advance from the first ignition timing to the second ignition timing is performed stepwise.

3. The rotation speed controller of an engine for working machine according to claim 1 or 2, characterized by comprising a digital control type ignition device which makes the engine rotation speed and the ignition timing correspond with each other for management.

4. The rotation speed controller of an engine for working machine according to claim 3, characterized by comprising an opening fixing function which fixes the throttle opening.

* * * * *